(12) United States Patent
Layton

(10) Patent No.: US 9,800,671 B1
(45) Date of Patent: Oct. 24, 2017

(54) REPEATEDLY ACCESSING A STORAGE RESOURCE NORMALLY ACCESSED THROUGH A WEB PAGE WITHOUT ACCESSING THE WEB PAGE

(75) Inventor: Kenneth T. Layton, Gilbert, AZ (US)

(73) Assignee: Intel Corporation, Santa Clara, CA (US)

(*) Notice: Subject to any disclaimer, the term of this patent is extended or adjusted under 35 U.S.C. 154(b) by 1346 days.

(21) Appl. No.: 09/605,928

(22) Filed: Jun. 28, 2000

(51) Int. Cl.
*G06F 15/16* (2006.01)
*H04L 29/08* (2006.01)

(52) U.S. Cl.
CPC .................................. *H04L 67/142* (2013.01)

(58) Field of Classification Search
CPC . H04L 29/06047; H04L 67/02; H04L 67/141; H04L 67/142; H04L 67/42; G06F 17/30861
USPC .................................. 709/218, 225; 710/22
See application file for complete search history.

(56) References Cited

U.S. PATENT DOCUMENTS

| | | | | |
|---|---|---|---|---|
| 5,812,529 A * | 9/1998 | Czarnik | ............. | H04L 41/5054 370/245 |
| 5,835,724 A * | 11/1998 | Smith | ..................... | H04L 29/06 709/202 |
| 6,240,369 B1 * | 5/2001 | Foust | ................................ | 702/3 |
| 6,295,061 B1 * | 9/2001 | Park | .................. | G06Q 30/0241 715/201 |
| 6,452,609 B1 * | 9/2002 | Katinsky | ........... | G06F 17/30053 707/E17.001 |
| 6,480,883 B1 * | 11/2002 | Tsutsumitake | .......... | H04L 29/06 709/203 |
| 6,589,290 B1 * | 7/2003 | Maxwell et al. | ............. | 715/507 |
| 6,947,992 B1 * | 9/2005 | Shachor | ............. | H04L 67/2814 709/227 |
| 2004/0039794 A1 * | 2/2004 | Biby | .................. | H04L 12/1827 709/217 |

* cited by examiner

*Primary Examiner* — Lance L Barry
(74) *Attorney, Agent, or Firm* — Trop Pruner & Hu, P.C.

(57) ABSTRACT

A storage resource may be accessed from a web page itself without recalling a web page. Instead hypertext markup language input objects on the web page may be populated from the storage resource using storage resource objects associated with a client browser. In this way, a connection may be established on the server to the storage resource for a given client browser. That connection may be utilized repeatedly to access data that is needed without reaccessing a web page. In some embodiments, this results in greater data access speed and less overhead, for example, in connection with remembering the various user selections that predate a given storage resource access request.

21 Claims, 6 Drawing Sheets

REPEATEDLY ACCESSING A STORAGE RESOURCE NORMALLY ACCESSED THROUGH A WEB PAGE WITHOUT ACCESSING THE WEB PAGE

BACKGROUND

This invention relates generally to using a client browser to access a storage resource from a web page on the browser.

Conventionally, it may be desirable to access data from a storage resource such as a database in the course of using a given web page accessed for example over the Internet. A user may access a web page that may have a form which the user fills out. The form could be one of a variety of hypertext markup language (HTML) input objects such as a list box or text box as two examples.

In the course of using such a web page, it may be necessary to obtain additional information from the web server and particularly from its database. Conventionally, there is no way to access the database without reaccessing or refreshing the same or a different web page. This means that a complicated protocol must be undertaken each time the user wishes to obtain data from the database in the course of using a given web page.

Every time a client browser accesses the database on a hypertext transfer protocol (HTTP) server, a request is made for a new web page from the server. Because the new web page is obtained from the server, there is considerable overhead associated with bringing the page back from the server to the client browser. Also, the browser must parse the HTML data and then display that data. In addition, a time delay arises because the user must access a new web page just to obtain the data from the database associated with the server that provides the web page.

Moreover, the client browser must remember, when it gets the data back from the database, how to incorporate that data with the selections already made by the user. For example, the web page may have a plurality of list boxes and the user may make a selection in the first list box. In order to complete the second list box based on the user's previous selection, the browser may access the server's database to bring back the data in the form of a new web page. But the client browser must still know how to fill out the first list box to reflect the user's previous selection that precipitated the call to the database. Thus, the client browser must remember what item in the first list box was clicked on. Then, the client browser must rebuild the web page on each iteration, remembering the prior selections. This overhead results in unnecessary data transmission, unnecessary complexity and decreased speed.

Thus, there is a need for better ways to access a storage resource from a web page.

DETAILED DESCRIPTION

Figure 1:
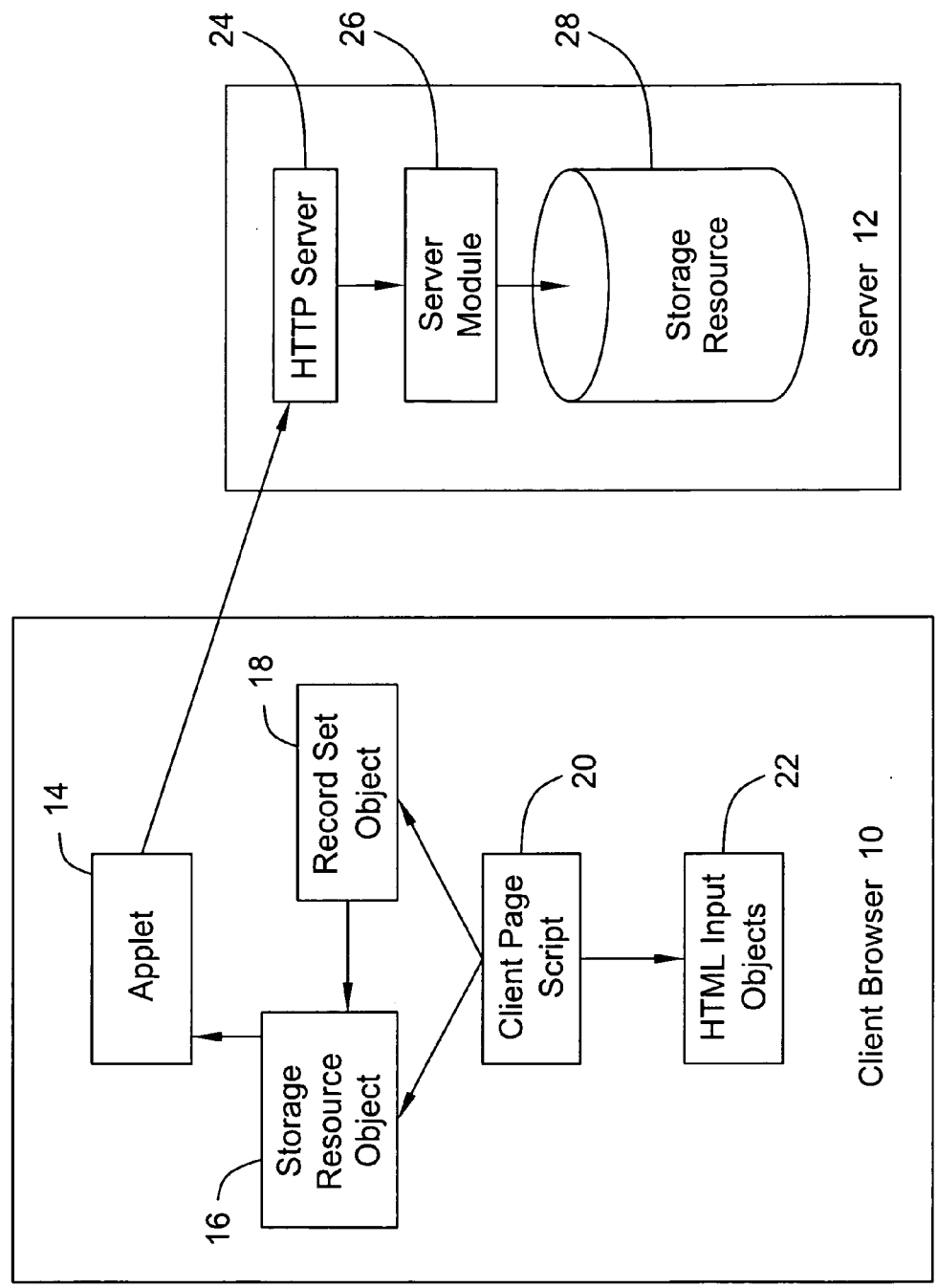
FIG. 1 is a schematic depiction of one embodiment of the present invention.

Referring to FIG. 1, a client browser 10, resident on a client processor-based system, may communicate over a network with a server 12. In one application of the present invention, the client browser 10 communicates over the Internet with the server 12. The server 12 may be responsible for providing a given web page on a given web site accessible over the Internet. The client browser 10 may access not only a web page from the server 12 but also data from a persistent storage resource 28, such as a database, flat file or directory resource.

The server 12 may include a hypertext transfer protocol (HTTP) or web server 24 which receives HTTP requests from browsers such as the browser 10. The server 24 communicates such requests to a server module 26. The server module 26 may, for example, be a common gateway interface (CGI) or a Microsoft active server page (ASP) server module. The server module 26 communicates with the storage resource 28 and forwards requests received from browsers, such as the browser 10, to the storage resource 28.

The client browser 10 includes at least one hypertext markup language (HTML) input object 22. Any of a variety of input objects 22 may be utilized in connection with the present invention including, as two examples, a list box and text box. The input object 22 merely provides an object oriented programming language object for receiving user selections through the client browser 10.

The client page script 20 is script on a web page accessed from the server 12 that uses the storage resource object 16 and the record set object 18. For example, the client page script 20 tells the storage resource object 16 to connect to the storage resource 28 and return, to the record set object 18, requested data. In particular, the client page script 20 relies on the storage resource object 16 and the record set object 18 to return data in a desirable organization that then may be readily accessed by the client page script 20.

The client page script 20 may access the data from the record set object 18 in given portions such as a record row at a time. The accessed data may be used to modify the HTML input objects 22 to reflect the data obtained from the storage resource 28. The client page script 20 may access the data, portion by portion, or, row by row, until all the data has been acquired.

The applet 14 communicates with the HTTP server 24. The storage resource object 16 receives requests from the client page script 20 and forwards the requests to the applet 14. The record set object 18 stores data obtained by the applet 14 from the storage resource 28. The storage resource object 16 uses the applet 14 as a virtual stream to communicate with the storage resource 28 through the server module 26 via an HTTP request. The storage resource object 16 represents a connection object.

In some cases, three separate modules 14, 16 and 18 may be advantageous since separate modules may enable customization without recompiling. However, the objects 16 and 18 and the applet 14 may be combined into one or two objects in some embodiments.

In some embodiments of the present invention, the applet 14, the storage resource object 16 and the client page script 20 may all be written using the JAVA language. However in other embodiments, ActiveX objects may be utilized. While an applet 14 is illustrated, any conventional transport may be utilized in place of the applet 14.

Referring to FIG. 2, an example of how the storage resource 28 may be accessed from a hypothetical web page 30 is illustrated. While the web page 30 is simplified for illustration purposes, those skilled in the art will appreciate that embodiments of the present invention may be applied to a wide variety of web pages to enable a storage resource to be accessed from the web page to complete an HTML input object 22 associated with the web page.

Figure 2A:
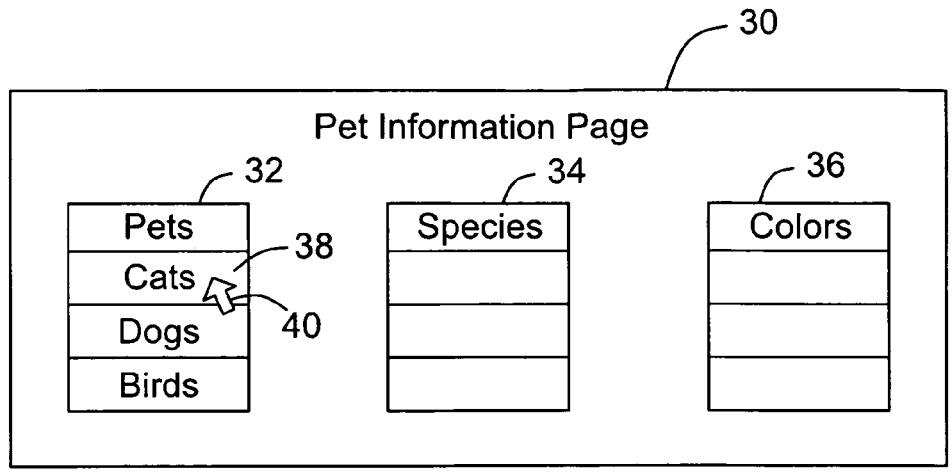
FIGS. 2A-2C are examples of screen displays associated with one embodiment of the present invention.

The web page 30, shown in FIG. 2A, is a pet information web page. The pet information web page 30 includes three list boxes 32, 34 and 36. The pet list box 32 lists three different types of pets (cats, dogs, birds). The species list box 34 will eventually list three species associated with each selectable type of pet listed in the list box 32. The color list box 36 will eventually indicate the colors for a selected species (list box 34) associated with a selected type of pet (list box 32).

Figure 2B:
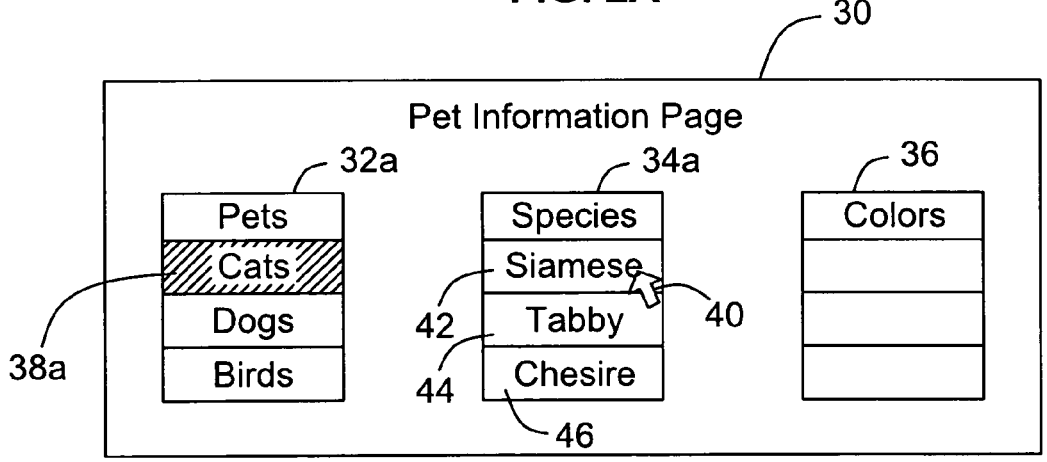

In this example, the user selects the cats pet category 38, for example by mouse clicking, using the cursor 40, on the cats category 38. As a result of the selection of the cats category 38, the cats category 38a is highlighted as indicated in FIG. 2B. The species information for the cats category 38a is then obtained from the storage resource 28. That is, the cat species of interest, such as Siamese 42, tabby 44 and Cheshire 46, are automatically filled in the list box 34a.

Advantageously, the operation of completing or filling in the second list box 34a occurs seamlessly as perceived by the user. In this way, the browser 10 can access the storage resource 28 directly from the web page 30 without the need to obtain a new, revised or different web page from the server 12. Instead, the data may be obtained and incorporated into the existing web page 30.

Figure 2C:
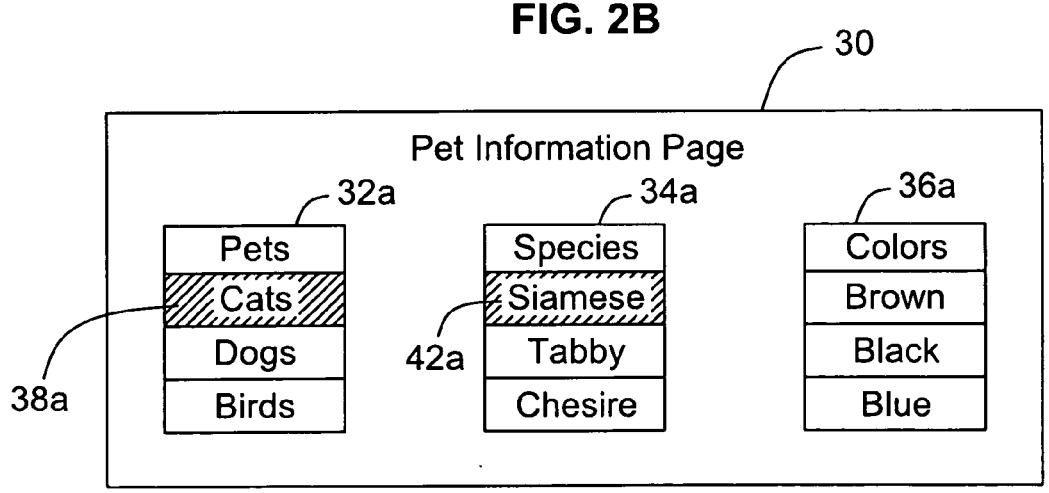

Thereafter, the user mouse clicks on the Siamese cat species 42 in the illustrated example. As a result, the web browser 10 may access the storage resource 28 to fill in the color list box 36a for the colors (brown, black, blue) appropriate for the Siamese species 42 as shown in FIG. 2C. In this case, the Siamese species 42a is now highlighted in the list box 34a as is the cat type 38a in the list box 32a.

Again, instead of accessing a new or modified web page, the existing web page 30 is simply filled in. There is no need to remember the previous selections (38a and 42a) since the same web page 30 continues to be displayed on the user's display screen.

Figure 3:
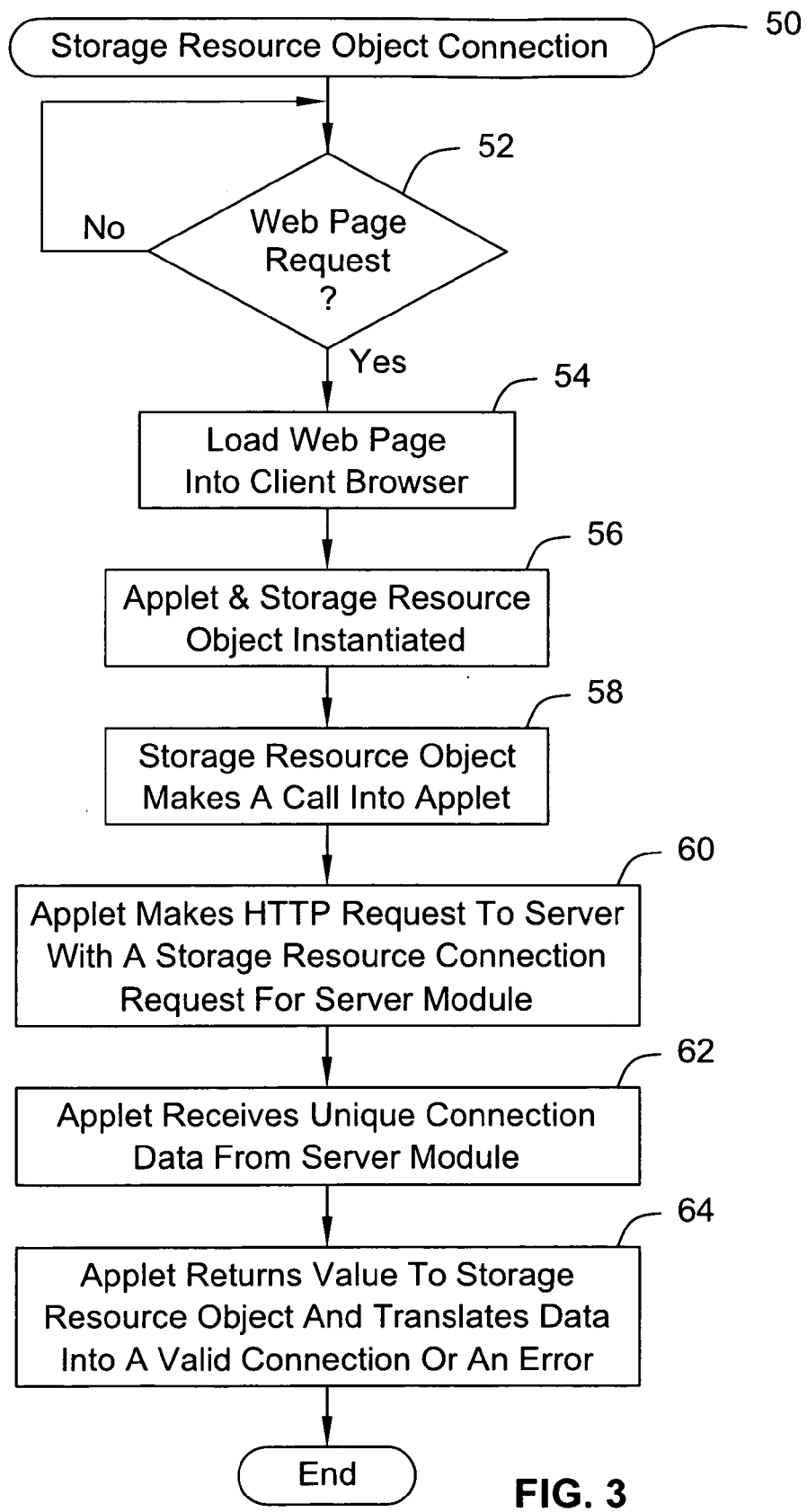
FIG. 3 is a flow chart for software for establishing a storage resource object connection in accordance with one embodiment of the present invention.

The software 50 for accessing the storage resource 28, in accordance with one embodiment of the present invention shown in FIG. 3, begins by monitoring for a web page access request as indicated in diamond 52. When the web page access request is received, the web page request is loaded into the client browser 10 as indicated in block 54. The applet 14 and storage resource object 16 are then instantiated as indicated in block 56.

The storage resource object 16 then makes a call into the applet 14 pursuant to the web page request that has been received, as indicated in block 58. The applet 14 then makes an HTTP request to the server 12 with a storage resource connection request for the server module 26 (block 60). That is, the applet 14 goes to the server 12 and has a connection established with the storage resource 28 through the server module 26. The server module 26 then makes a call into the storage resource 28 and brings data out as a raw stream of data.

The applet 14 receives unique connection data from the server module 26 (block 62). The unique connection data may be, for example, a number that identifies a particular connection from the module 26 to the storage resource 28 associated with a particular browser 10. The current connection for the storage resource 28 connection may be reestablished or reaccessed by simply providing the connection number the next time that the browser 10 wants to access the storage resource 28. In one embodiment of the present invention, each browser 10 may have its own separate connection. Thus, the connection to the storage resource 28 is connectionless on the client side even though the connection associated with the client is represented on the server side.

The applet 14 then returns the value received from the storage resource 28 to the storage resource object 16 as indicated in block 64. The applet 14 also translates the data into a valid connection or an error indication.

Figure 4A:
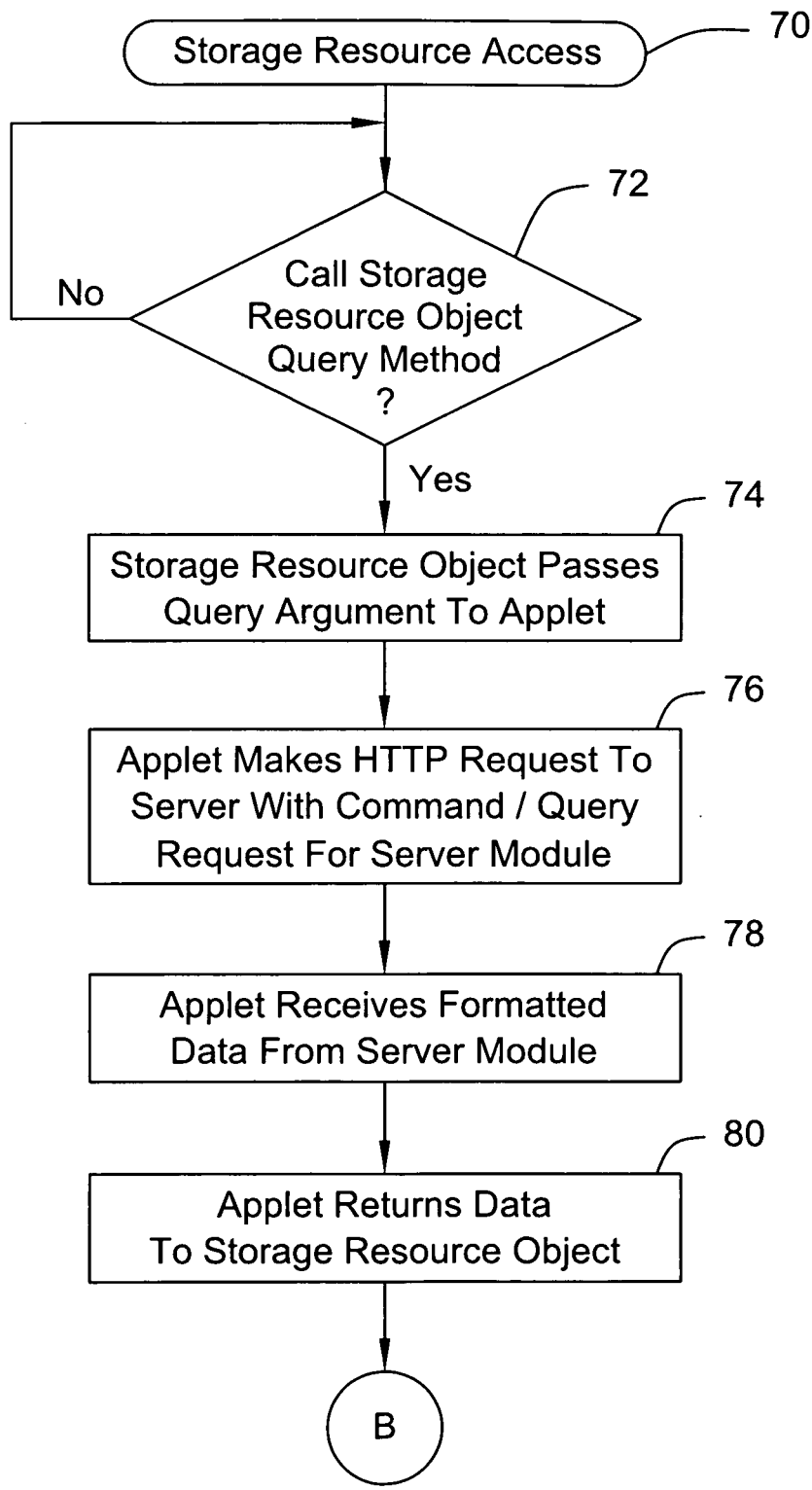
FIGS. 4A and B are flow charts for software for accessing a storage resource from a web page in accordance with one embodiment of the present invention.
Figure 4B:
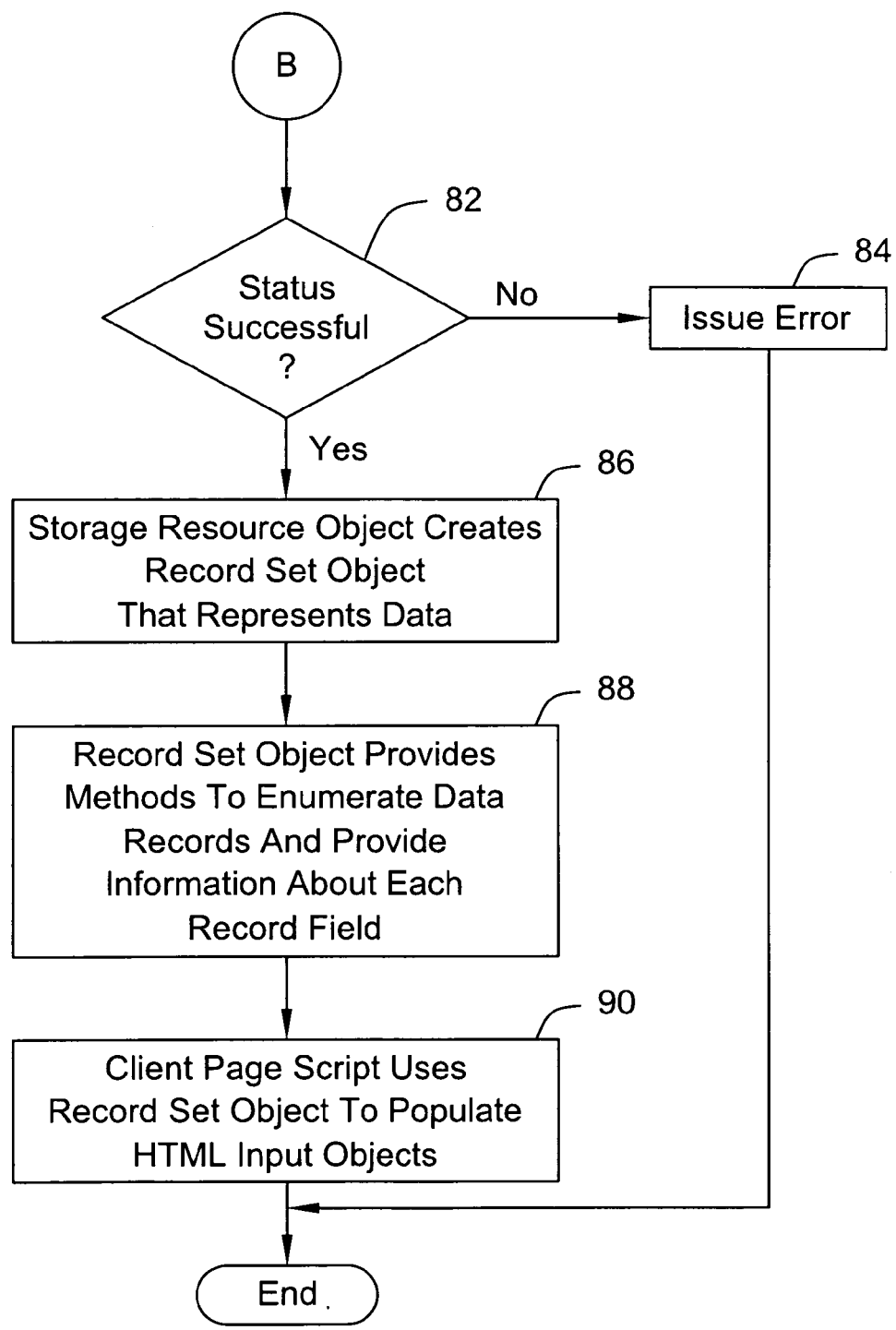

Turning next to FIG. 4A, the storage resource access software 70 begins after the storage resource object 16 and applet 14 have already been instantiated and connected. Thereafter, a query method associated with the storage resource object 16 may be called to receive data or results from the storage resource 28. When the query method is called, as determined in diamond 72, the storage resource object 16 passes the query argument to the applet 14 as indicated in block 74. Next, the applet 14 makes an HTTP request to the HTTP server 24 with a command/query request for a server module 26 as indicated in block 76. The server module then performs the request and returns formatted data that is transferred back to the applet 14 as indicated in block 78. The applet 14 returns the data to the storage resource object 16, as indicated in block 80. The storage resource object checks the data's status (either valid or error) as indicated in diamond 82 of FIG. 4B. If the status is error, an error indication may be issued as indicated in block 84.

Otherwise, the storage resource object 16 creates the record set object 18 that represents the data received from the storage resource 28 (block 86). The record set object 18 provides methods to enumerate data records and provides information about each record field as indicated in block 88. This information may then be used to populate the existing HTML input object 22 through the client page script 20 in a dynamic and seamless manner as indicated in block 90.

The input objects 22 never appear to go away as they are being populated by the script 20. Thus, referring to the example shown in FIGS. 2A, 2B and 2C, when the user mouse clicks on the cats entry 38 in the pets list box 32, the data needed to populate the list box 34 is obtained from the web page 30 through the procedure just described. The data then seamlessly appears in the list box 34a as shown in FIG. 2B. The web page 30 and its list boxes 32, 34 and 36 never appear to go away. Instead, the data just changes in the list boxes 32, 34 and 36.

Repopulating the input objects 22 may be much faster, in some embodiments, than having to make a request to the server 12 to get an entire web page back from the database 28. Moreover, the ensuing HTML input objects 22 may be filled out without needing to remember the selected entries (such as the entry 38a in the list box 32a). Thus, there may be less overhead in some embodiments by using embodiments of the present invention.

The script 20 may simply obtain the event, arising from the fact that the user clicked on an item in a given input object 22, pull whatever the user clicks on and tell the applet 14 to go to the storage resource 28 and get the information needed for the next ensuing input object 22. The applet 14 then brings back the data and populates the ensuing input objects 22 such as the list box 34a. Similarly, when the user selects the Siamese species 42a, the same action occurs to complete or populate list box 36a in FIG. 2C.

The applet 14, objects 16 and 18, and client page script 20 may also be used to perform updates to storage resources such as databases. For example, in the example shown in FIG. 2, new species may be added when a command to update the resource, received by the script 20, is provided to the storage resource object 16.

Figure 5:
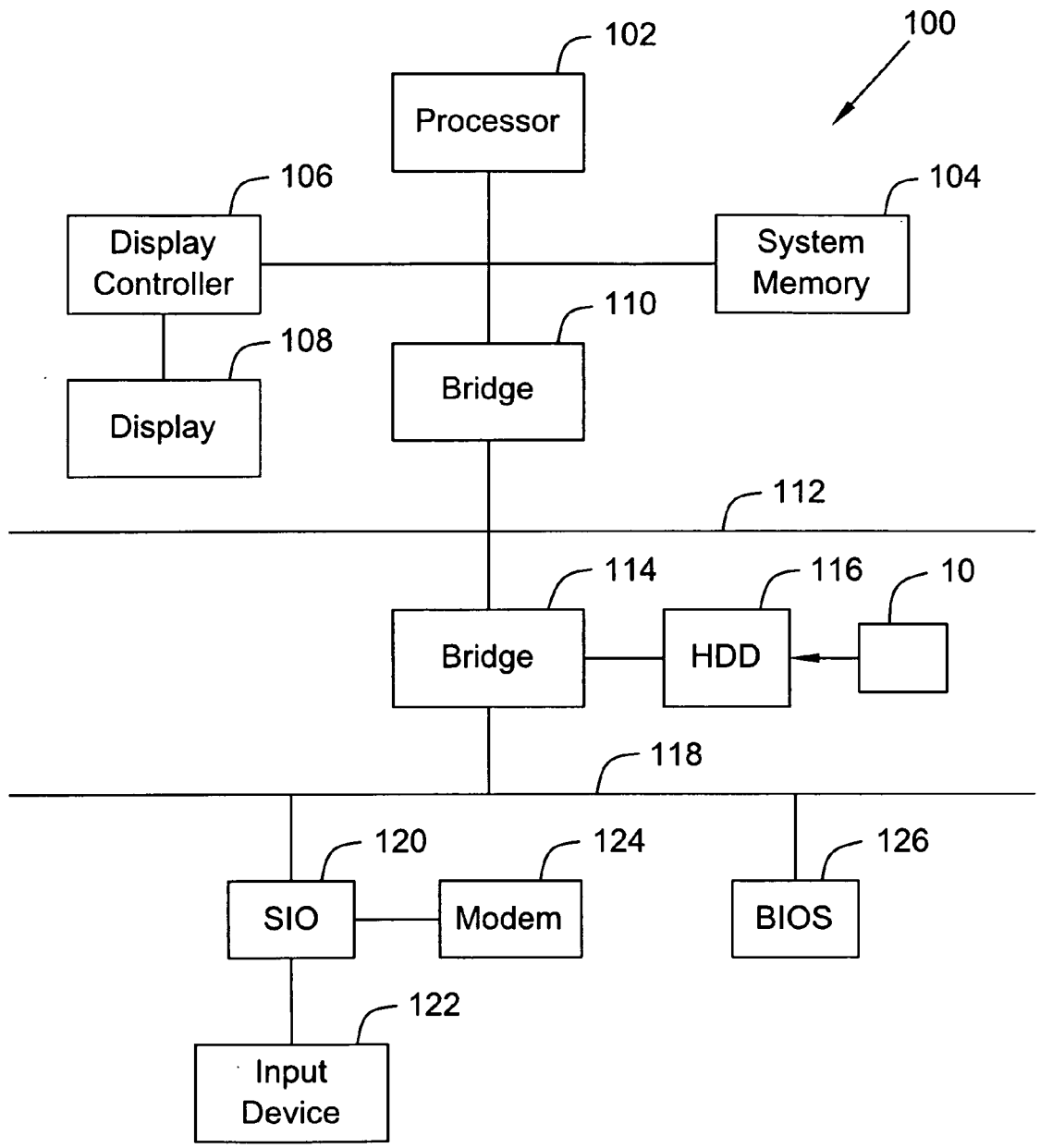
FIG. 5 is a block diagram of the system in accordance with one embodiment of the present invention.

Referring next to FIG. 5, a processor-based system 100 may be a desktop computer, a laptop computer, a handheld computer, a processor-based appliance or even a cellular phone. The system 100 includes a processor 102 coupled to a system memory 104 and a display controller 106. The display controller 106 drives the display 108. The processor 102 is also coupled to a bridge 110 that in turn couples a bus 112.

The bus 112 is coupled to a bridge 114 which couples a second bus 118. The bridge 114 is coupled to a hard disk drive 116 that stores the browser 10.

The bus 118 supports a serial input/output (SIO) device 120 which may be coupled to an input device 122 such as a keyboard. The SIO device 120 is also coupled to a modem 124 for Internet access. The bus 118 is also coupled to a basic input/output system (BIOS) memory 126.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   establishing a connection with a server to access a web page from said server;
   making a web page request to the server involving accessing a storage resource;
   accessing a web page through said server and obtaining information from the server to enable a subsequent connection to the storage resource accessible by said server;
   establishing a new connection with the server; and
   using said information, in said new connection, to access the storage resource again in the same state the resource was in when a previous connection was terminated without again accessing the web page.

2. The method of claim 1 including using a transport to communicate between a client browser and the server.

3. The method of claim 2 including using a storage resource object to forward requests for storage resource access to said transport.

4. The method of claim 1 including storing data received from said storage resource in an object.

5. The method of claim 4 including accessing said data from said object.

6. The method of claim 5 including populating a hypertext markup language input object on said web page using said data accessed from said storage resource.

7. The method of claim 1 including requesting through a web browser a web page from a server and maintaining a connection on said server for said browser to said storage resource.

8. The method of claim 1 including using an object to organize the data received from said server in a predetermined format.

9. An article comprising a device storing instructions enabling a processor-based system to:
   establish a connection with a server to access a web page from said server;
   access a web page through said server to obtain information from the server to enable a subsequent connection to the storage resource accessible by said server;
   make a web page request to the server involving accessing a storage resource;
   establish a new connection with the server; and
   use said information, in said new connection, to access the storage resource information again in the same state the resource was in when a previous connection was terminated without again accessing the web page.

10. The article of claim 9 further storing instructions that enable the processor-based system to use a transport to communicate between a client browser and said server.

11. The article of claim 10 further storing instructions that enable the processor-based system to use a storage resource object to form requests for storage resource access to said transport.

12. The article of claim 9 further storing instructions that enable the processor-based system to store data received from said storage resource in an object.

13. The article of claim 12 further storing instructions that enable the processor-based system to access said data from said object.

14. The article of claim 13 further storing instructions that enable the processor-based system to populate a hypertext markup language input object on said web page using said data accessed from said storage resource.

15. The article of claim 9 further storing instructions that enable the processor-based system to request, through a web browser, a web page from the server and maintain a connection on said server to said storage resource for said browser.

16. The article of claim 9 further storing instructions that enable the processor-based system to use an object to organize the data received from said server in a predetermined format.

17. A system comprising:
   a processor-based device; and
   a storage storing instructions to establish a connection with a server to access a web page from said server, make a request to the server involving accessing a storage resource, access a web page through said server and obtain information from the server to enable a subsequent connection to the storage resource accessible by said server, and use said information, in said subsequent connection, to access the storage resource again in the same state the resource was in when a previous connection was terminated without again accessing the web page.

18. The system of claim 17 wherein said storage stores a client browser, said client browser including a transport, a storage resource object and a client page script, said client page script makes requests for data to said storage resource object, said storage resource object forwards said requests to said transport and said transport makes requests for data to an external server, said client page script using said data to populate input objects on said client browser.

19. The system of claim 18 wherein said transport is an applet.

20. The system of claim 18 further including a record set object to store data from said server.

21. The system of claim 18 wherein said browser obtains data from said server without accessing the data as a web page.

* * * * *